United States Patent
Gabel et al.

(10) Patent No.: US 7,092,025 B2
(45) Date of Patent: Aug. 15, 2006

(54) VIDEO CAMERA ADAPTER FOR PROVIDING DECREASED DEPTH OF FOCUS

(75) Inventors: Benjamin Gabel, Frankfurt (DE); Wolfgang Weigel, Ottobrunn (DE)

(73) Assignee: P & S Technik, Munich (DE)

( * ) Notice: Subject to any disclaimer, the term of this patent is extended or adjusted under 35 U.S.C. 154(b) by 319 days.

(21) Appl. No.: 10/469,295

(22) PCT Filed: Feb. 27, 2002

(86) PCT No.: PCT/EP02/02089

§ 371 (c)(1),
(2), (4) Date: Aug. 29, 2003

(87) PCT Pub. No.: WO02/069622

PCT Pub. Date: Sep. 6, 2002

(65) Prior Publication Data

US 2004/0080657 A1 Apr. 29, 2004

(51) Int. Cl.
H04N 5/225 (2006.01)
G03B 17/00 (2006.01)
B60R 1/06 (2006.01)

(52) U.S. Cl. .................. 348/335; 396/530; 359/508
(58) Field of Classification Search ............ 348/335, 348/360, 361; 396/529, 530; 359/362, 443, 359/507, 508
See application file for complete search history.

(56) References Cited

U.S. PATENT DOCUMENTS 6,697,115 B1 * 2/2004 Amano .................. 348/360

FOREIGN PATENT DOCUMENTS

| DE | WO 01 81 995 A | | 4/2001 |
|---|---|---|---|
| EP | 0 950 912 A2 | | 10/1999 |
| EP | 1 014 705 A2 | | 6/2000 |
| JP | 07-151946 | * | 6/1995 |

* cited by examiner

*Primary Examiner*—David Ometz
*Assistant Examiner*—Kelly Jerabek
(74) *Attorney, Agent, or Firm*—Edward L. Kelley; Invention Management Associates

(57) ABSTRACT

The invention relates to a video camera having a camera housing (30), a first objective (12), through which light from a scene (14) to be picked up is guidable into the camera housing 30, a semiconductor sensor field (28), on which light from the scene (14) to be picked up is able to be cumulated, wherein it further includes: a projection area (16) disposed with respect to the first objective (12) such that light introduced through the first objective (12) is imaged onto the projection area (16), a second objective (26) disposed with respect to the projection area (16) and to the semiconductor sensor field (28) such that light from the projection area (16) is imaged onto the semiconductor sensor field (28). It further relates an adapter for a video camera having an adapter housing (30'), an objective (12), through which light from a scene (14) to be picked up is guidable into the adapter housing (30'), wherein the adapter further includes: a projection area (16) disposed with respect to the objective (12) such that light introduced through the objective (12) is imaged onto the projection area (16), wherein the adapter housing (30') has means for attaching the adapter to the video camera such that the objective (26) of the video camera is able to be directed onto the projection area (16), so that the image on the projection area (16) can be recorded by the video camera.

7 Claims, 2 Drawing Sheets

VIDEO CAMERA ADAPTER FOR PROVIDING DECREASED DEPTH OF FOCUS

BACKGROUND OF THE INVENTION

1. Field of the Invention

The present invention relates to a video camera including a camera housing, a first objective, through which light from a scene to be picked up is guidable into the camera housing, and a semiconductor sensor field, on which light from the scene to be picked up is able to be cumulated. It further relates to an adapter for a video camera, including an adapter housing and an objective, through which light from a scene to be picked up is guidable into the adapter housing.

2. Description of the Related Prior Art

The invention deals with the problem of depth of focus. Since video cameras exist, attempts are made to copy the "look" of a celluloid film picture. For the following three reasons, this fails: firstly, the resolution of film is currently still much higher than that of video. Secondly, the contrast range of film is substantially higher, and thirdly, the depth of focus of a 35 mm film is distinctly lower.

The last-mentioned reason may rather seem like a disadvantage for a layman, but in effect is exactly the opposite for an expert. Low depth of focus is of extraordinary importance especially in making cinema films. However, what is felt as especially "film-like", namely a quickly decreasing depth of focus, is not typical for all of the existing film formats at all. "Super 8" or "16 mm" are—due to the small imaging area—in the worst case well-focused like a video. However, also films on these formats are not yet felt as especially "film-like". The everyday perception of what is "film-like" is characterized by the continuous consumption of materials of the field of the 35 mm film: All of the Hollywood movies, all advertising films, all of the big video clips are still formed exclusively on this format. And this consumption has characterized the perception. For example, a "Tatort" filmed on a 16 mm film, will hardly be perceived as especially "film-like" by anyone. Each layman will note that the "X files" filmed on 35 mm film look somehow otherwise.

As already indicated, the depth of focus is critically influenced by the size of the recording area. A conventional 35 mm film negative is huge compared to the recording chip of a video camera. This size makes it possible that the depth of focus decreases. On the contrary, the video film-maker fails to achieve a desired lack of depth of focus due to the small area of the chip.

With regard to the fact that the resolution and the contrast of video cameras are almost daily improved, the lack of depth of focus is currently the unsolved problem of video cameras. From the company Canon it is known to place photo optics in front of a video camera by means of an adapter. However, this results in the chip being much too small with regard to the film optics, to show only a detail of the projected image. The effect arising thereby is that the focal length of the optics seems to extend. Optics representing a normal objective with respect to cameras, becomes a teleobjective on a video camera.

In order to obtain the same image detail on the small chip of the video camera, which is achieved by a film camera having any optics, unequally much more wide-angled optics have to be used (approximately 7-times). This is possible, however, the achieved lack of depth of focus is thereby lost, since this one is inseparably associated with the actual length of the focal length. Namely, it is true: the smaller the formed image and the shorter the focal length of the optics, which is required for imaging a certain image detail thereon, the larger the depth of focus.

Therefore, the present invention is based on the object of developing a video camera of the initially mentioned type such that achieving low depths of focus is made possible.

BRIEF SUMMARY OF THE INVENTION

According to the invention, this object is accomplished in that the generic video camera further includes a projection area disposed with respect to the first objective such that light guided through the first objective is imaged onto the projection area, as well as a second objective disposed with respect to the projection area and to the semiconductor sensor field such that light from the projection area is imaged onto the semiconductor sensor field.

By this two-step imaging, in which the first objective is preferably film optics and the second objective can be the objective of a conventional video camera, a low depth of focus can be achieved as desired.

Only by this measure, it is made possible that video cameras are employed in the field of the film industry not only for test and control purposes, that is as an auxiliary means, but in the future take the tasks, which have been taken by film cameras heretofore. The invention makes available the combination of elements of the field of the film technique and elements of the video field: the use of cheap and repeatedly usable recording medium as well as the low weight of the video camera, the selection of many different optics usual in the film industry with simultaneous achieving the desired lack of depth of focus of the film camera. It is quasi a synergistic association of the formats film and video separated up to now.

In a preferred embodiment, the projection area is a mat surface, especially a mat glass disk. Insofar as the surface is transparently formed, this offers the possibility of disposing the first objective such that light from the scene to be picked up is imaged onto the front side of the projection area, and the second objective is disposed such that light from the backside of the projection area is imaged onto the semiconductor sensor field. This results in a compact construction of the video camera and minimization of the optical elements. The latter is especially preferred because by each optical element, losses, for example in the light intensity or the focusing, are introduced.

For the first objective, preferably, film optics are used, especially optics from the 35 mm range, wherein then the projection area is preferably rectangular and has a width of e.g. 25 mm. By this adaptation of the projection area to the optics used for the first objective, optimum obtaining the lack of depth of focus achieved by the film objective is allowed. A projection area having a width of e.g. 25 mm is really huge compared to the area of a conventional CCD chip of a video camera. With respect to the second objective, the essential requirement is that it has to be designed such that the light from the projection area is well-focused imaged onto the semiconductor sensor field. Since the actual optical operation is already done by the first objective, therefore, the second objective can be of distinctly less quality compared to the first objective. Especially, the second objective can be optimized with respect to its actual task, namely the well-focused imaging of the image on the projection area onto the semiconductor sensor field. Due to this specialization of the scope of tasks of the second objective, these can be realized with low cost.

Usually, the video camera includes a recording mechanism, by which the semiconductor sensor field can be read out and the read-out data can be stored.

Preferably, the projection area is encapsulated, since dust and small impurities depositing on the projection area lie exactly on the focal plane in the present invention, and thus would always be imaged well-focused onto the semiconductor sensor field. For this purpose, clear filter glass is especially suited, which is disposed in front of and behind the projection area. By appropriate selection of the distance from the projection area, it can be ensured that impurities depositing on the filter glass are no longer imaged in disturbing manner onto the semiconductor sensor field.

In order that the structure of the ground glass disk, i.e. the structure used for achieving the matting, does not affect the imaging characteristics of a video camera according to the invention or of an adapter according to the invention in disturbing manner, but especially also in order to let "disappear" dust particles sticking on the ground glass disk or on the encapsulation of the ground glass disk, in a preferred development, means are provided to move the ground glass disk, i.e. the projection area, e.g. to reciprocate or to rotate it about an axis through the projection area. Therein, the speed of movement is to be selected so high that the structure of the ground glass disk or dust particles on the ground glass disk or the encapsulation, respectively, can no longer be resolved in the image being able to be read out from the semiconductor sensor field.

The above object is also accomplished in that the initially mentioned adapter further includes a projection area disposed with respect to the objective such that light guided through the objective is imaged onto the projection area, wherein the adapter housing has means for attaching the adapter to the video camera such that the objective of the video camera is able to be directed to the projection area so that the image can be recorded on the projection area by the video camera.

As already stated above, the requirements to the second objective can be relatively low, so that conventional video objectives can be employed for that. Preferably, the adapter is formed such that its objective can be easily exchanged. Thereby it is achieved that an inexpensive video camera mutates to a high-quality recording apparatus by use of such an adapter, wherein the results of recording with respect to depth of focus are comparable to that of known film cameras. In case that the projection area cannot be well-focused imaged onto the semiconductor sensor field with the normal objective of the conventional video camera, it can be necessary to replace it by a macroobjective. Alternatively, a macro effect can be achieved by connecting another objective in series with the normal objective. The term objective of the video camera as is used in the application is to also include this combination.

Preferably, the projection area has no marks or markings. As already above discussed in context with the video camera according to the invention, the projection area is preferably a mat surface, especially a mat glass disk, so that the objective of the adapter can be disposed such that light from the scene to be picked up is imaged onto the front side or the projection area, wherein the means for attaching the adapter to the video camera is designed such that the objective of the video camera is able to be directed to the backside of the projection area.

It is understood that for the objectives of the adapter, all of the formats known from the film industry are considered, but wherein with respect to the excessive choice, "35 mm optics", i.e. optics for imaging on 35 mm wide film strips, of very different focal lengths are preferred.

As already set out in context with the video camera according to the invention, the projection area is preferably encapsulated between two transparent disks in order to prevent the imaging of impurities on the projection area onto the semiconductor sensor field, and/or means is provided for moving the projection area, especially for rotating it about an axis through the projection area. Further advantageous embodiments result from the dependent claims.

BRIEF DESCRIPTION OF THE SEVERAL VIEWS OF THE DRAWINGS

In the following, an embodiment is described more detailed with reference to the attached drawings, wherein.

DETAILED DESCRIPTION OF THE INVENTION

Figure 1:
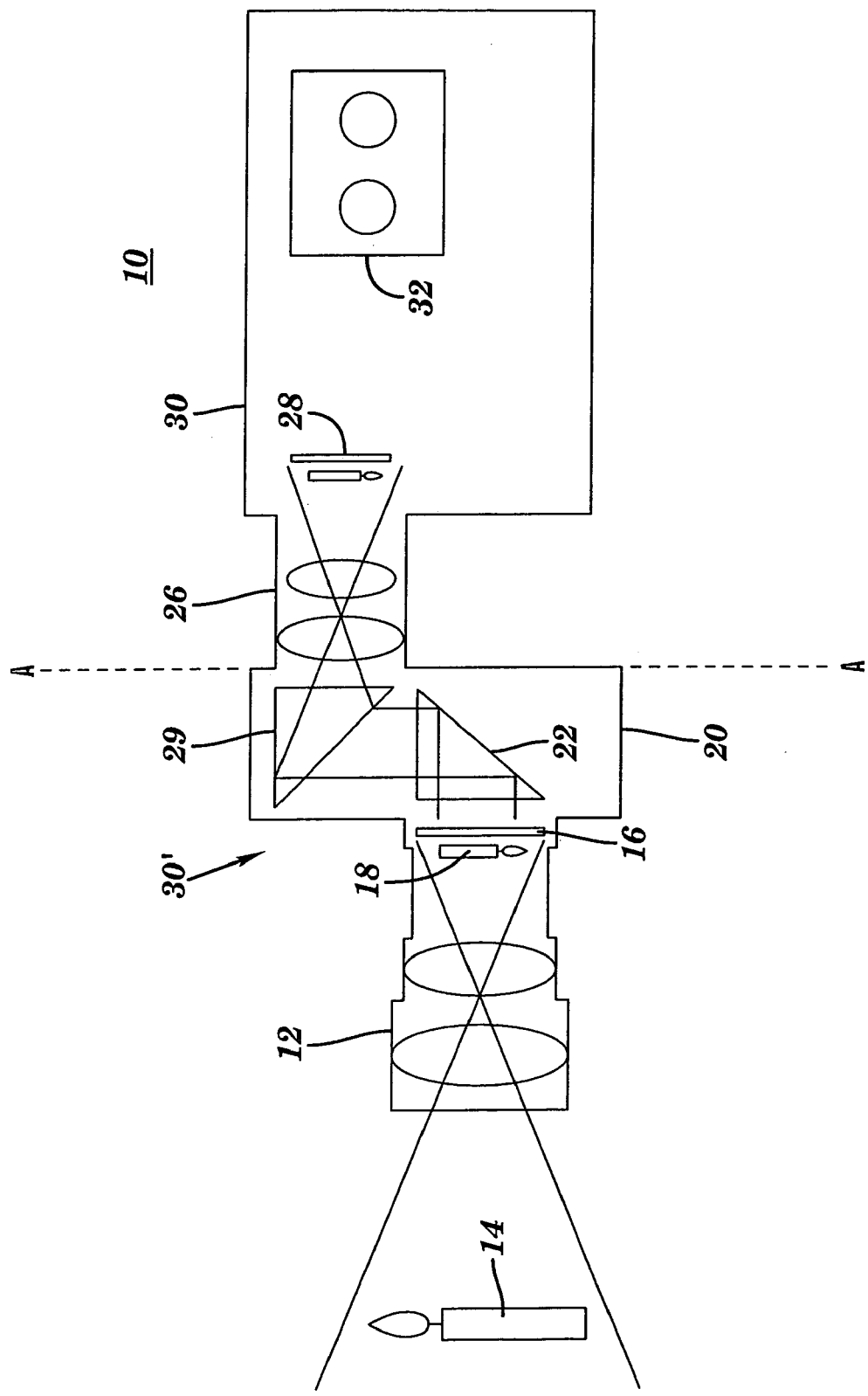
FIG. 1 shows in sectional schematic view the construction of a video camera according to the invention; and, FIG. 2 shows a belt drive for rotating a roundly formed ground glass disk.

The video camera 10 according to the invention, illustrated in FIG. 1, includes a first objective 12, by which a scene 14 to be recorded can be well-focused imaged on a mat glass disk 16. The mat glass disk 16 has no marks or markings. Its size is adapted to the used objective 12. For example, in use of 35 mm optics as the objective 12, the mat glass disk 16 has a width of 35 mm. With regard to the size of the imaging effected on the mat glass disk 16 by the first objective 12, see below, this one should preferably have a size of at least 25 mm×19 mm in case of use of 35 mm optics. However, this first objective 12 can be optics of any format known from the film industry. However, as already mentioned, due to the great choice, 35 mm optics are preferred. The mat glass disk 16 has a front side showing an image 18 of the scene 14 to be imaged. The image 18 is turned upside down with respect to the original. The light passing through the mat glass surface 16 is guided through a prism block 20 in order to reerect the mirror-inverted image 18 turned upside down. In FIG. 1, a first 22 and a second prism 24 are schematically indicated in the prism block. For one skilled in the art, it is evident that the object of the prism block 20 can also be effected by other constellations, above all also in electronic manner.

Instead of the optical erection of the image 18 by the prism block 20, shown here, an erection in electronic manner is also considered. The last mentioned measure is preferred since transmission of the light through the mat glass disk as well as the prisms 22 and 24 is associated with lightness and quality lost.

The light exiting the prism 24 passes through a second objective 26, thereby imaging the original 14, finally again turned upside down, on a semiconductor sensor field 28, for example a CCD (charged coupled device). In the housing 30 of the video camera, as schematically illustrated in FIG. 1, further a recording mechanism 32 is accommodated, by which the semiconductor sensor field 28 can be read out and the read out data can be stored.

With regard to the adapter according to the invention, the adapter includes the elements represented on the left hand of the line AA in FIG. 1, wherein again especially preferred the prism block 20 can be omitted. On the right hand of the line AA in FIG. 1, with regard to the adapter according to the invention, a customary video camera is represented. The objective 12, the projection area 16 as well as the prism block 20 are accommodated in an adapter housing 30'.

In an embodiment, not shown, the projection area has an area-like formed front side, while the backside is curved. This curve acts as an optical lens. According to the invention, in this design, this optical lens is to be considered as a part of the second objective, by which the image on an area-like formed backside of the projection area—presently to be assumed fictitious—is imaged onto the semiconductor sensor field.

Preferably, the projection area is further encapsulated between a clear filter glass disposed in front of the projection area and one disposed behind it.

In order that the structure of the ground glass disk, i.e. the structure used for achieving the matting, does not influence the imaging characteristics of a video camera according to the invention or of an adapter according to the invention in disturbing manner, but especially also to let "disappear" dust particles sticking on the ground glass disk or the encapsulation of the ground glass disk, means can be provided for moving the ground glass disk, i.e. the projection area, e.g. to reciprocate and/or to rotate it about an axis through the projection area. Therein, the speed of movement is to be selected so high that the structure of the ground glass disk or dust particles on the ground glass disk or the encapsulation, respectively, can no longer be resolved in the image being able to be read out from the semiconductor field.

Figure 2:
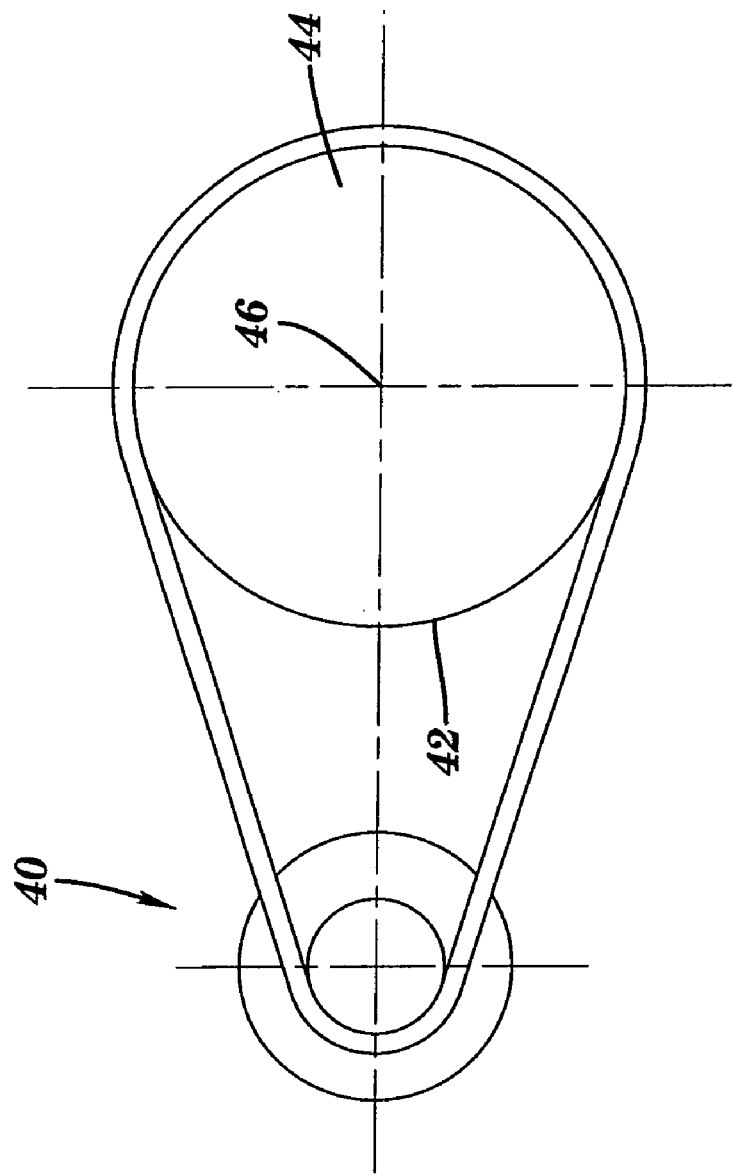

In a preferred realization, shown in FIG. 2, the rotation of the ground glass disk is effected by a belt drive 40, which engages the circumferential surface 42 of a roundly formed ground glass disk 44. Since in an exclusive rotational movement, the point of the ground glass disk, which is on the rotational axis 46, is not moved, and thereby the problem of imaging the structure or dust particles continues to exist there, it is even more preferred if the rotational movement is combined with a linear movement, so that as a whole a kind of "tumbling" movement or an eccentric rotational movement occurs.

In preferred embodiments, the rotational speed is between 1 and 10 revolutions per second, preferably between 3 and 7 revolutions per second, and even more preferred e.g. 5 revolutions per second.

The invention claimed is:

1. Adapter for a video camera, comprising:
   an adapter housing (30') for attaching the adapter to the video camera;
   a first objective (12), accommodated in the adapter housing (30'), through which light from a scene (14) to be picked up is guidable into the adapter housing (30');
   a projection area (16) movably supported with respect to the adapter housing (30') and disposed with respect to the first objective (12) such that light guided through the first objective (12) forms a first image of the scene (14) onto an image surface of the projection area; and, wherein the projection area (16) comprises a round disk (44) having a circumferential surface (42) and further wherein a means for moving the projection area comprises a belt engaged with the circumferential surface and a belt drive (40) configured to rotate the round disk about an axis.

2. Adapter according to claim 1 wherein the belt drive is configured to rotate the round disk at a rate of between 1 and 10 revolutions per second.

3. Adapter for a video camera (10), comprising:
   an adapter housing (30') for attaching the adapter to a video camera housing (30);
   a first objective lens (12) attachable to the adapter housing (30') for receiving light from a scene (14) and forming a first image of the scene (14) within the adapter housing (30'), said first image being formed with at least one dimension in the range of 19 to 35 mm;
   a projection area (16) disposed within the adapter housing (30') and movably supported with respect thereto, said projection area (16) including a mat surface formed thereon and positioned to receive said first image of the scene thereon; and,
   means for rotating the projection area (16) with respect to the first image.

4. The adapter of claim 3 wherein the video camera (10) comprises a second objective lens (26), and a semiconductor sensor field (28) each supported by the video camera housing (30), and further wherein the adaptor is configured to direct light from the first image of the scene to the second objective lens (26) and further wherein the second objective lens (26) is configured to form a second image of the scene onto the semiconductor sensor field (28) with said second image being formed with an image format size that is smaller than the image format size of the first image.

5. The adaptor of claim 4 wherein said projection area (16) comprises a round disk (44) having a circumferential surface (42) and supported for rotation about a rotation axis (46) and further wherein said means for rotating the projection area (16) comprises a belt engaged with the circumferential surface and a belt drive (40) for driving the belt to rotate the projection area about the rotation axis.

6. The adaptor of claim 5 wherein the projection area (16) is rotated about the rotation axis at a rotation speed in the range of 1 to 10 revolutions per second.

7. The adapter of claim 6 wherein the projection area (16) comprises a transparent glass element.

* * * * *